DOUBLE PULSE SWITCH CONTROL SYSTEM AND CIRCUIT

Filed Aug. 30, 1966 3 Sheets-Sheet 1

Oct. 20, 1970 E. C. DOWLING ET AL 3,535,691

DOUBLE PULSE SWITCH CONTROL SYSTEM AND CIRCUIT

Filed Aug. 30, 1966 3 Sheets-Sheet 3

United States Patent Office
3,535,691
Patented Oct. 20, 1970

3,535,691

DOUBLE PULSE SWITCH CONTROL SYSTEM AND CIRCUIT

Edward Camp Dowling, Harrisburg, and John Breniser Thomas, Camp Hill, Pa., assignors to AMP Incorporated, Harrisburg, Pa.

Filed Aug. 30, 1966, Ser. No. 576,150
Int. Cl. H04q *3/00;* G11c *11/02*
U.S. Cl. 340—166 10 Claims

ABSTRACT OF THE DISCLOSURE

This invention relates to an overlap switching circuit for setting and clearing a plurality of memory elements. A drive circuit "sets" a selected element by a first pulse and then "clears" the remaining elements by a second pulse. The next setting pulse selects a given element and is followed by a clearing pulse which clears all elements except the last selected element.

This invention relates to a control system and circuit for selectively actuating switches. The invention is particularly adaptable for use in providing a controlled closure of a given selected switch and simultaneously opening a previously selected switch with an overlap of switch closure of the two switches to eliminate undesirable effects due to switch bounce. This field of use is important in any area of communications where switch bounce may cause a loss of intelligence, erroneous intelligence or, as in the field of video switching, objectionable visual effects.

In an application entitled Programming Control System, S.N. 555,998, filed June 8, 1966, in the name of E. C. Dowling et al., there is described a system for controlling programming of signal sources which are to be selectively transmitted in accordance with a desired sequence. The disclosure there given is directed to the communication art in general and particularly to that part of the art which relates to color television programming. In accordance with the system provision is made to select one of a large number of video or audio signal inputs and to connect such selected input to an output bus which leads to transmission equipment and also to equipment which permits monitoring of both the signal on line and a preset signal which is next to be placed on line. The actual switching is accomplished through a switching module which contains relays having energizing coils driven through an interface by magnetic cores. These relays are constructed so that if one attempts to close a relay and at the same time open another relay the relay being closed will not operate as quickly as the relay being opened with respect to switch action. This is because when a relay opens there is no bounce and when a relay closes there is an appreciable bounce which finds the switch signal being applied and then taken off the output and then reapplied for a longer period of time and then taken off again and so on. This problem with relays has led to the use of what is termed as "overlap" switching which operates so that when it is desired to switch between two relays the closed relay is left closed for a period of time until the closing relay has stopped bouncing. Reference is made to U.S. application S.N. 537,090, entitled Signal Switching Circuit filed Mar. 24, 1966 in the name of E. C. Dowling et al., for a description of a circuit which achieves the foregoing results and provides overlap switching. In the circuit of this latter case each separate switching module is provided with a delay network which has a low input impedance so that when a closure signal is applied the coils of the relays are immediately driven to closure but that when such signal is terminated there is a delay before the coils of the relay are deenergized.

In large systems there are dozens and perhaps hundreds of signal sources and switch modules and the use of a circuit individual to each module to accomplish overlap switching is quite costly. This practice is also undesirable in that each of the switch modules must have some kind of tolerance and operation which is different from an adjacent module. As a further point the control logic required to effect selections in a large matrix of switch modules is made difficult, particularly with respect to timing of switching function in relation to the vertical synchronization pulse in a color television system.

Accordingly, it is an object of the invention to provide a system and circuit for obtaining a controlled overlap switching between switches selected to place a given input on an output bus and to remove a preselected signal input from such bus.

It is a further object to provide a system and circuit for overlap switching for a large number of switches through a circuit which is common to all switches and which automatically provides switch closure and switch opening in an overlap sequence.

It is still another object to provide a simple and reliable circuit for providing overlap switching of a plurality of switches automatically keyed into a clock such as the vertical synchronizing pulse in television systems.

It is still another object of the invention to provide an all solid state control common to a large number of switches which is readily adjustable in terms of the period of overlap between switch closure and switch opening.

The invention attains the foregoing objectives in its system aspect by providing a memory element for each of a number of switches which are each adapted to supply a distinct input to a common output bus which leads to transmission equipment. The memory elements are arranged in circuit to be driven in common by a driver capable of initiation by selection of any one of the switch modules to be connected to the output bus to provide a first setting drive pulse which causes switch closure and then, after a controlled time of delay, to automatically clear all other memory elements in the system without clearing the selected element. In a specific embodiment of the circuit the foregoing function is achieved by windings made to link magnetic cores in a common circuit so that drive pulse energy is applied to all of the cores all of the time but the sense of application is made to selectively set and clear cores in a pattern to achieve a given signal selection.

Figure 1:
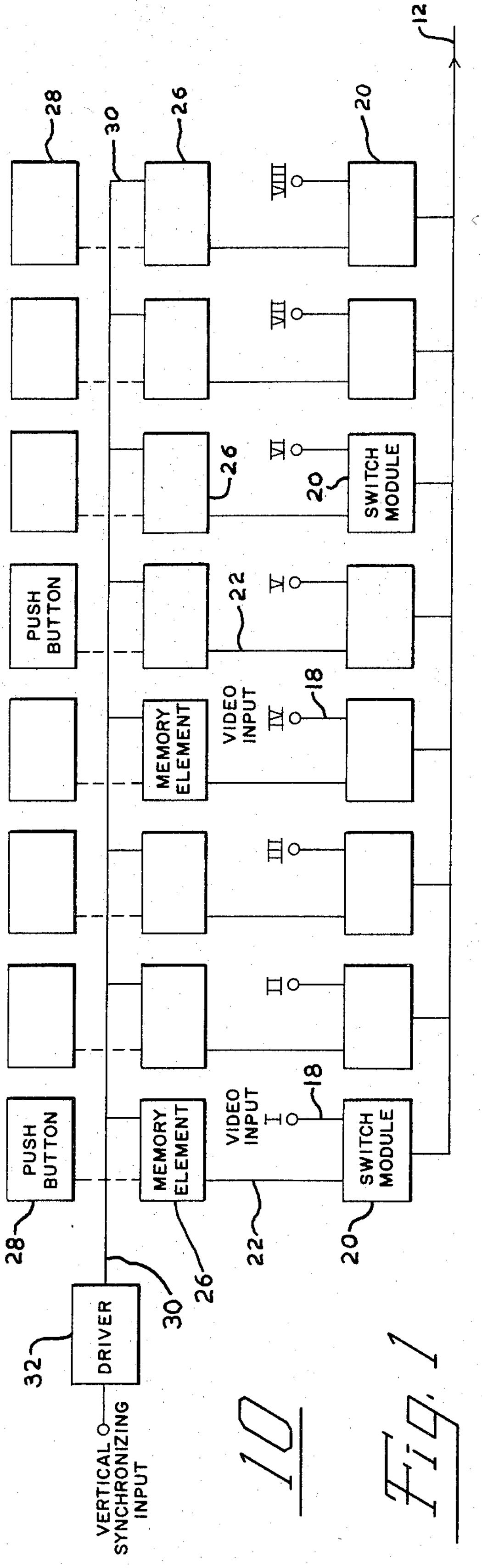
FIG. 1 is a block diagram of a system circuit in accordance with the invention.

Referring now to FIG. 1 the system of the invention is shown as 10. The lead shown as 12 represents an output bus which goes to transmission equipment and is in accordance with the invention made to supply such equipment with a signal to be transmitted or broadcast. As an example the output signal may be considered as a video signal supplied from one of a number of input sources of the type utilized by television stations. The various input signal sources are shown connected by leads such as 18 to switch modules shown as 20. These switch modules may be considered as any suitable device capable of being energized and deenergized to close and open an electrical circuit. These inputs are here shown for the purposes of illustration as video inputs I–VIII. It is to be understood that in a typical application the inputs may be greater in number than eight and reference is made to the previously mentioned application S.N. 555,998 for a disclosure of a system having a large number of signal inputs. Each of the switch modules 20 is arranged to be controlled by a signal applied by a lead shown as 22 from a memory element shown as 26 capable of being driven into a set or clear stable state. In accordance with the invention, when the memory element is caused to produce an output on lead 22, the switch module is caused to close and connect the input signal source associated therewith to the output bus 12. Thus, when the memory element 26 is operated to produce an output signal, switch module 20 connects the signal source I to the output bus 12. Each of the memory elements in the system is arranged to be driven by a lead 30 which is connected to a driver capable of supplying drive pulses to the various memory elements for setting a selected memory element and, as will be detailed hereinafter, for clearing all other memory elements associated with the line 30. In accordance with the invention the driver 32 is arranged to be driven by vertical synchronizing pulses so as to be automatically synchronized with a television system. It is to be understood that in other types of communication applications the vertical synchronizing pulse would be the clock of the system. Above each memory element there is shown a push-button such as 28 which is associated with one memory element and one switch module in the same column.

In accordance with the invention, depression of a push-button operates to set a given memory element to one of its stable states and cause closure of the associated switch module and connection of a signal input to the output bus. Then, through operation of the driver 32 at a later period of time, a further pulse is automatically applied through lead 30 which pulse is in a sense to clear all of the other memory elements. In usual practice only one of the other memory elements will have been set and it will be cleared to cause the switch module associated therewith to open and disconnect the associated input from the output bus 12. The time between the first application of a pulse to set a given memory element and close a given switch module and the second pulse to clear a preselected memory element and open a preselected switch module is determinative of the overlap time heretofore mentioned.

Figure 2:
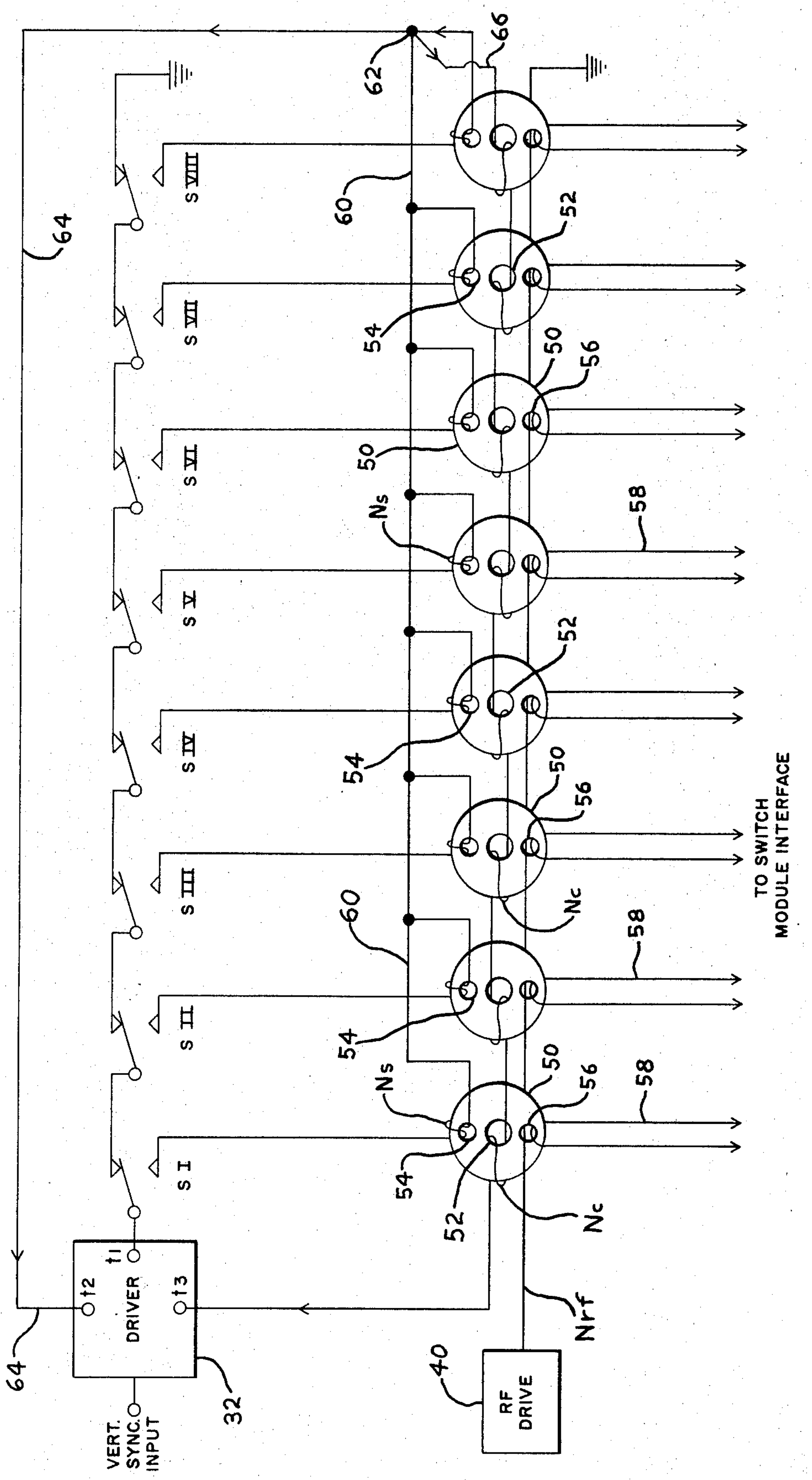
FIG. 2 is a general schematic diagram showing various memory elements in circuit with switches and windings arranged to achieve the function of the invention.

Referring now to FIG. 2 where certain components are carried over from FIG. 1 and certain components are shown in more detail, the organization and the circuit arrangement for driving the memory elements is shown for eight columns I–VIII. Each of the memory elements is in accordance with a preferred embodiment of the invention a multi-aperture magnetic core have square-loop characteristics and capable of being driven into two distinct stable states of magnetic remanence. These states, which are referred to as set and clear states, are effected in the cores by the application of an MMF through windings linking portions of the cores. These windings are pulsed with current pulses made to be of an amplitude and time duration to effect a desired switching of the flux in the cores to achieve the stable states. Each of the cores is like the first core shown as 50 and includes a major aperture 52 and a plurality of minor apertures such as 54 and 56. The major aperture is threaded with turns denominated $N_C$ which are in a sense to clear the core when pulsed with current. The minor aperture 54 is threaded with turns $N_S$ which are in a sense to set the core when pulsed with current. The minor aperture 56 is an output aperture and is threaded with turns $N_{RF}$ which operates to switch flux locally about the minor aperture without switching flux around the major aperture or without disturbing the stable state of the core. The amplitude of the RF drive relative to the turns $N_{RF}$ is limited for this purpose. Reference is made to U.S. applications S.N. 249,465 and S.N. 249,466, filed Jan. 4, 1963, to J. C. Mallinson et al., for a description of a preferred winding and drive scheme for multi-aperture cores for read-out purposes. Also threading the output apertures 56 is a coupling loop 58 which goes to a switch module interface and ultimately to a switch module. The interface should contain a suitable filter to block noise from the switch and a cathode follower to amplify the signal to drive the switch coils. Reference is made to S.N. 537,090, above-mentioned, for this teaching. When a core is cleared the flux in the core is so oriented that the RF applied to $N_{RF}$ will switch substantially no remanent flux and therefore no voltage will be induced in the coupling loop 58. When a core is set the RF applied via $N_{RF}$ will switch substantial remanent flux about the aperture 56 and will therefore cause an induced voltage in 58 and a current will flow. This current and voltage is utilized to drive a switch module to close switch contacts as heretofore mentioned. The absence of a voltage and current permits the switch module associated therewith to open the contacts thereof and remove the input signal associated therewith from the output bus.

In FIG. 2 a manual switch is provided for each column of memory elements and switch modules. These switches, labeled S–I—S–VIII are commonly supplied from the driver 32 to a terminal labeled *t*1. While manual switches are preferred for certain applications, relay or solid state switches may also be used, and are contemplated. The switches are constructed so that operation of any of the push-buttons serves to route the drive signal supplied from 32 to the memory element in the column of the depressed push-button. As can be seen the switches S–I—S–VIII are normally closed to a path which extends across the array of switches and each switch is operable to open such path and close a path to a selected core. Viewing the left hand column of the array in FIG. 2, it will be apparent that depressing push-button I will close the contacts of S–I to the winding linking the left hand core through turns $N_S$ to apply a setting MMF to that core. The current forming this pulse will then flow through the winding which is numbered 60 to a common point shown at 62, which branches into two windings 64 and 66. The circuit of the driver is made so that initial depression and closure of a given switch causes the winding 64 to be connected to a low impedance path and the winding 66 to be connected to a high impedance path. Accordingly, current is made to flow through winding 64 to return to the driver 32 through a terminal *t*2. The core in the column I will then be set and an output voltage will be produced in the coupling loop 58 which leads to the switch module interface and then to the switch module of the column. This will cause a connection of video input I to the output bus 12.

At this time it may be assumed that some other one of the cores is set and that the switch module associated therewith is closed and that there is another input signal applied to the output bus 12. It may also be assumed that all of the other cores are cleared and that all of the other switch modules are disconnected.

The unit 32 will in a manner to be described produce a second pulse after a short delay which will again traverse the lead 60 applying a setting current to the core in column I. At this time, however, the unit 32 will have changed the impedance at terminal *t*2 to a high value and the impedance at terminal *t*3 to a low value so that the current arriving at point 62 will be fed through the lead 66. As is apparent lead 66 links each of the cores in the array with turns $N_C$ and therefore a clearing MMF is applied to each of the cores. Accordingly, each of the cores in the array except the core in column I will be cleared. The previously set core (in another column) and the previous closed switch module will operate to disconnect the previously selected signal source from the output bus. The core in column I will not be disturbed because at the same time the clearing MMF is applied thereto there is also a setting MMF from $N_S$ which is made to cancel out the clearing MMF from $N_C$. This will then leave the core in column I set and the switch module associated therewith connecting its signal input to the output bus. An overlap will have been provided between the signals associated with the two columns connected during the delay.

Figure 3:
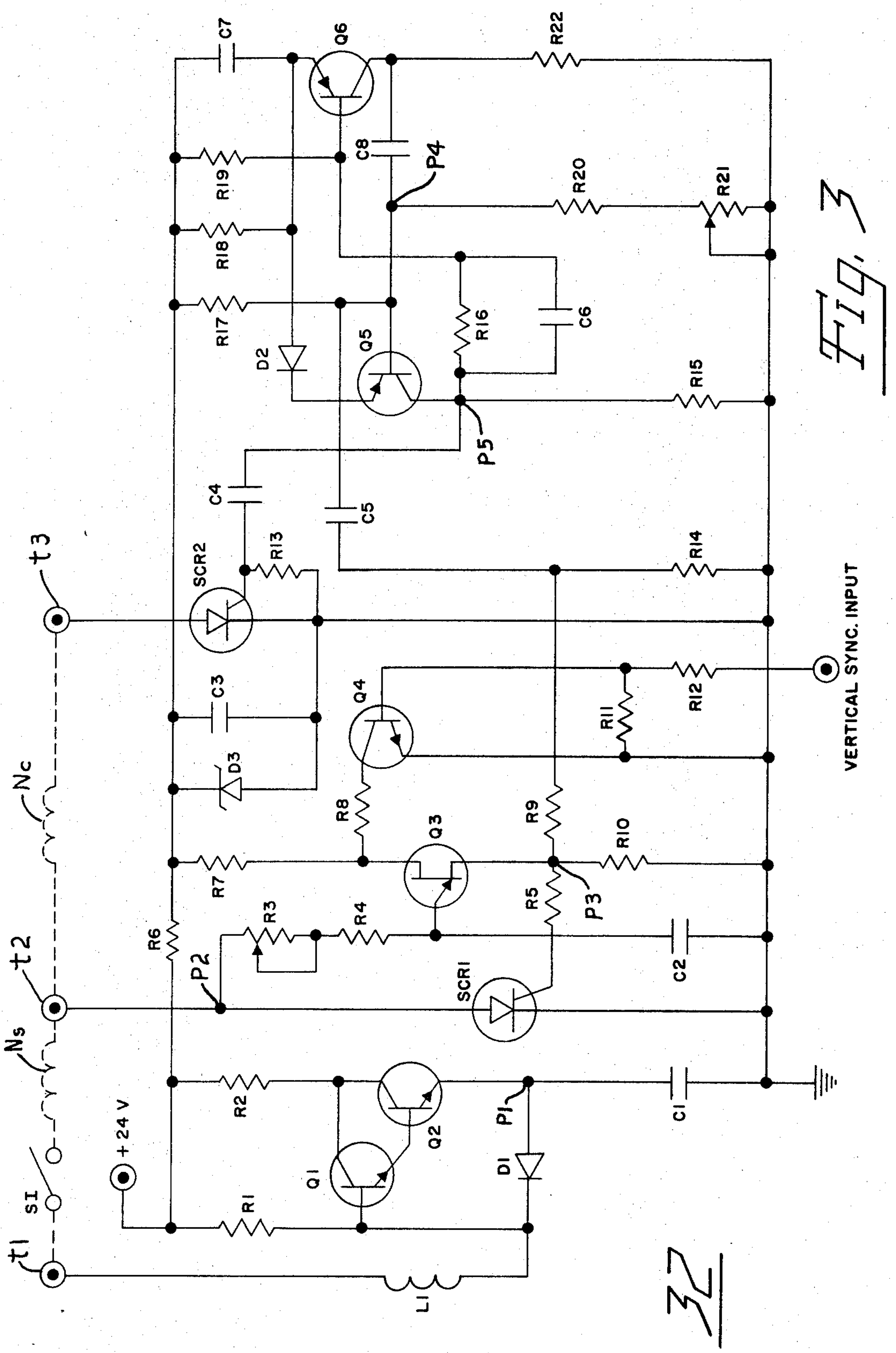
FIG. 3 is a detailed schematic diagram of the driver of the invention.

Turning now to a general description of the driver 32, FIG. 3 shows a preferred circuit and certain components are repeated from FIG. 2 to assist an understanding of circuit operation in relation to the system. Thus, at the top left of the drawing there is shown a switch S–I and turns $N_S$ and $N_C$ which relate to column I of the array shown in FIGS. 1 and 2. Also shown is a vertical synchronizing input lead. The terminals *t*1, *t*2 and *t*3 are also shown in FIG. 3 and may be related to the description previously given for an understanding of the general function of the driver. The general operation of the driver may be summarized as follows. Upon closure of switch S–I a pulse is developed through turns $N_S$ from a capacitor shown as C–1. This pulse sets the selected core. Then, after a delay provided by a monostable multivibrator (including transistors $Q_5$ and $Q_6$) shown to the right of the schematic diagram in FIG. 3, a second pulse is developed from C–1 which has had time to recharge. This second pulse is made to flow through turns $N_S$ and $N_C$ to accomplish the clearing function heretofore described. Control and routing of the pulses is accomplished by opening switches which, in the preferred embodiment, are silicon controlled rectifiers SCR–1 and SCR–2. Operation of these switches is synchronized with the clock of the system which in the preferred embodiment is the vertical synchronizing pulse of a television system. The circuit shown in FIG. 3 is common to all of the cores and all of the switch modules and thus to the system of the invention. It replaces the use of individual delay networks associated with each switch module and each memory element as used in prior practice. As will be discerned, all of the elements therein are standard, well-known and reliable electronic components. The supply for the circuit is shown as 24 volts and thus is also standard.

To describe now the detailed operation of the circuit, we may again assume that some one core is set and that some one switch module is closed in a column different from column I and that it is desired to effect a selected connection of the signal source associated with column I to the output bus. The switch S–I is then depressed. In this regard it is well to remember that manual closure of switching contacts effects a closure of at least forty to fifty milliseconds. At the time S–I is closed the capacitor C–1 is charged at the supply voltage of 24 volts. This means that the point *p*–1 is also at 24 volts and upon closure of S–I the point *p*–2 will immediately go to 24 volts. When this occurs the capacitor C–2 will start to charge through limiting resistors R–1, R–3 and R–4. The resistors R–3 and R–4 and the capacitor C–2 form an RC network, which has a time constant made adjustable through R–3, which is a variable resistor. Connected between R–4 and C–2 is a unijunction transistor Q–3 which through its emitter is made to experience the voltage building up on C–2.

Figure 4:
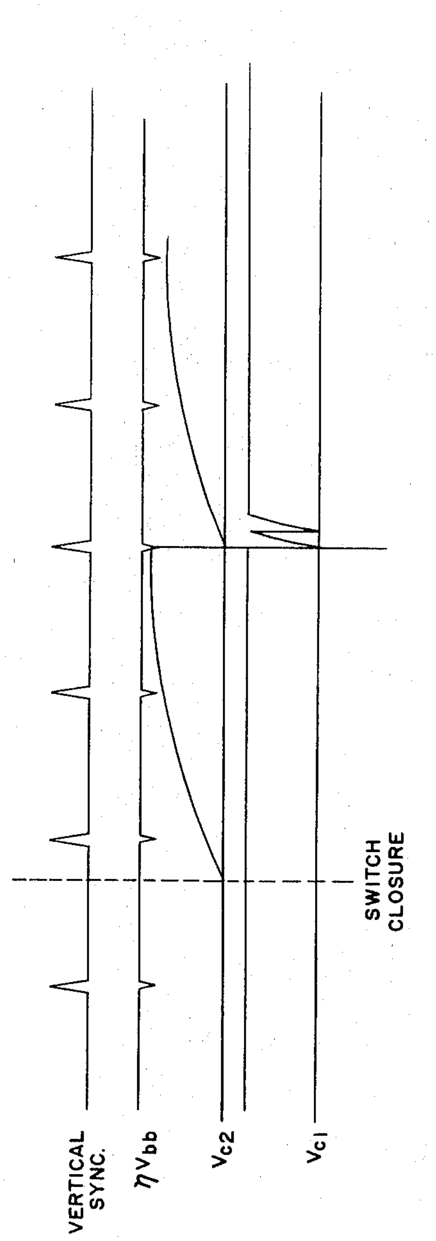
FIG. 4 is a time sequence diagram showing how the circuit of FIG. 3 achieves its function.

FIG. 4 shows a time sequence plot of the voltage on C–1, the voltage on C–2 and a selected time of switch operation for S–I. Unijunction transistors, such as Q–3, have what is known as an intrinsic stand-off ratio, $\eta$, which determines the device break down or firing voltage for a given base 1 to base 2 voltage, $V_{BB}$. The firing voltage is typically expressed as $\eta V_{BB}$ and it is that quantity which, if applied to the emitter, will cause current flow from the emitter through the base electrode B–1.

As will be apparent from the circuit FIG. 3, the vertical synchronizing pulse is applied through a limiting resistor R–12 to the base of a transistor Q–4 having its emitter coupled to ground and the collector thereof tied to the base B–1 of Q–3 through a balancing resistor R–8. Each time the vertical synchronizing pulse is applied to the lead it will cause conduction of Q–4 to draw current from the B–1 electrode of Q–3 through the limiting resistors R–6, R–7 and R–8 from the supply. This will cause a variation in the $\eta V_{BB}$ applied to Q–3 indicated in FIG. 4. When C–2 reaches a given quantity which is approaching, but not quite at the voltage to normally cause Q–3 to conduct, the next synchronizing pulse to occur will so change the quantity $\eta V_{BB}$ that Q–3 will conduct, the charge on C–2 flowing through Q–3 and R–10 to ground. This will cause a voltage pulse which is positive at the point shown as *p*–3, which is coupled through a resistor R–5 to the gate of the SCR–1. This will fire SCR–1, opening a path to ground which extends from its anode back to the terminal *t*2 through the turns $N_S$, the switch S–I, the terminal *t*1, a pulse forming inductor L–1, the diode D–1 and capacitor C–1. The charge on C–1 will then be dumped through to produce the setting in MMF in the manner heretofore described. At the same time, the positive pulse occuring at *p*–3, is coupled through a capacitor C–5 which serves to block DC to the base of a transistor Q–5, part of the monostable multivibrator to the right of the circuit. The transistor Q–5 has its emitter tied through a blocking diode D–2 to a supply lead through resistor R–18 and resistor R–6. The positive pulse serves to cut Q–5 off and cause the monostable vibrator to go over, Q–6 coming on, supplied from R–18, R–6 and the 24 volt supply. When Q–6 goes on, a capacitor C–8 connected to its collector electrode begins to charge at a rate determined by the RC network including C–8, R–20 and R–21. As will be observed, R–21 is a variable resistor and it may be adjusted to set this rate. The resistor R–22, shown in this circuit connected to the emitter of Q–6, is for current limiting. When the point shown as *p*–4 becomes sufficiently negative due to the charge on C–8, the base of Q–5 will then be again biased to a point where Q–5 will conduct to cut off Q–6 through the cross coupling thereto including diode D–2. When Q–5 goes on, the point *p*–5 connected to its collector, will swing positive and that will cause SCR–2 to fire from a pulse coupled through C–4 to the gate of SCR–2. The timing of the firing of Q–5 and Q–6 is made to be such that by the time SCR–2 is fired C–1 will have again charged up to supply voltage. When SCR–2 fires, C–1 will dump through D–1, terminal *t*1, S–I, turns $N_S$ and $N_C$, terminal *t*3 through SCR–2 to ground. The diode D–3 and capacitor C–3 are provided in the supply to reduce rippling which will cause a variation in the operation of the monostable circuit. The transistors Q–1 and Q–2 are connected in a Darlington network to provide the charge for C–1 from the supply. The diode shown as D–1 operates to cut off Q–1 while the SCR's are conducting. This is to prevent the SCR's from locking on in a circuit from the supply through the output of Q–2 which charges C–1.

The remaining components are standard and no detailed description is deemed necessary therefor.

As will be apparent the circuit of FIG. 3 operates to provide the double pulse drive heretofore described relative to the system.

In an actual circuit the following components were used.

Q–1, Q–2, Q–4: 2N3646.
Q–5, Q–6: 2N3638.
Q–3: 2N2646.
SCR–1, SCR–2: 2N1595.

Capacitors—
- C–1: 1 microfarad.
- C–2: .47 microfarads.
- C–3: 10 microfarads.
- C–4: .001 microfarads.
- C–5: .001 microfarads.
- C–6: 500 micromicrofarads.
- C–7: .22 microfarads.
- C–8: .068 microfarads 250 volts.

Diode D–1: 10D2.
Diode D–2: IN914.
R–1: 18K ohms.
R–2: 100 ohms.

R–3: 1.0 megohms.
R–4: 100K ohms.
R–5: 470 ohms.
R–6: 470 ohms.
R–7: 390 ohms.
R–8: 2.7K ohms.
R–9: 680 ohms.
R–10: 27 ohms.
R–11: 33K ohms.
R–12: 3.3K ohms.
R–13: 1K ohms.
R–14: 82K ohms.
R–15: 2.2K ohms.
R–16: 22K ohms.
R–17: 27K ohms.
R–18: 330 ohms.
R–19: 51K ohms.
R–20 6.8K ohms.
R–21: 50K ohms.
R–22: 4.7K ohms.
Zener diode: RN3022B.
L–1: 15 microhenries.

Having now disclosed and described the invention in terms intended to enable its preferred practice we define it through the appended claims.

What is claimed is.

1. In a circuit for providing overlap switching, a plurality of memory elements, a switch for each element and an input for each switch, with each memory element being linked to a switch to operate said switch to connect or disconnect its input to an output bus dependent upon the state of the memory element associated therewith, a drive circuit including means to supply first and second pulses having a controlled delay therebetween, and means to initiate operation of said drive circuit said drive circuit being connectable in parallel to a plurality of leads, one for each element, means to selectively apply said pulses to a selected one of said leads and to a selected one of said elements to drive said selected element to a set state responsive to the first pulse of said two pulses and thereby cause said element to drive the associated switch to connect the associated input to the said output bus, a further circuit linking all of said elements in series and for driving said elements to a clear state, said further circuit being also connected to said first selected element whereby application of said second pulse is operable to clear all of said elements except said selected element, the setting drive operating to cancel the clearing drive in said selected element, whereby to selectively set a given element and at a later time clear any other elements in said plurality of elements to provide an overlap of signals applied to said bus by said switches.

2. The circuit of claim 1 wherein each of said elements is a magnetic core having square-loop characteristics and said drive pulses are applied directly from said driver through leads and windings made to link said core in a sense to effect said setting and clearing functions.

3. The circuit of claim 1 wherein each of said elements is a multi-aperture core of square loop material and said drive pulses are supplied by leads linking said cores through minor and major apertures whereby setting pulses are applied through a core minor aperture and clearing pulses are applied through a core major aperture.

4. The circuit of claim 1 wherein said means to supply first and second pulses having a controlled delay therebetween include a capacitor means connected to a supply to be charged thereby prior to operation of said means to initiate operation of said drive circuit to develop energy for said first pulse and means to cause said capacitor to be again charged to develop energy for said second pulse after operation of means to initiate operation of said drive circuit.

5. The circuit of claim 1 wherein means to initiate operation of said drive circuit is a switch which is initiated by manual control and said drive circuit includes means to provide a delay between first operation of said last mentioned switch and said first pulse to preclude noise therefrom from modifying said first pulse on operation of said drive circuit.

6. In a circuit for supplying setting and clearing drive pulses to a plurality of memory elements, means to select a given element, means to initiate said circuit to supply a first pulse through a first winding linking a selected element and means responsive thereto to provide a trigger delayed a given period of time to cause said circuit to generate a second pulse, means in said circuit to cause said second pulse to be supplied to a second winding linking all of said memory elements in a sense to clear all said elements, the said last mentioned means including means to inhibit clearing of said selected element whereby said selected element is set and the remaining elements are cleared.

7. The circuit of claim 6 wherein said memory elements are each linked by a first winding in parallel with said first windings connected to a single second winding in series with said first windings, a lead connected to said first windings in series with ground and means to close a path to ground via said lead to route said first pulse through a first winding to the selected element and then open said path to ground whereby said second pulse is routed through the first winding to the selected element and simultaneously through the second winding to all said elements.

8. The circuit of claim 7 wherein said element is a magnetic core capable of being driven by said pulses to be set or cleared into stable states and said first winding links each core separately to set said core responsive to the first pulse and said second winding links each core in series whereby to supply a clearing driver, responsive to said second pulse, the said setting and clearing drivers being made to cancel out in the selected core and the clearing driver being made to clear at least another core of said plurality of core elements.

9. The circuit of claim 6 wherein the said means to initiate said circuit includes a single pulse driver capable of producing the said first and second pulses, a plurality of switches, one for each element, said plurality of switches being connected in series to said driver and separately connectable to a given element to selectively apply drive pulses to said element, the connection of drive pulses to a selected element operating to preclude selection of another element until after said pulses have been applied to said windings.

10. The circuit of claim 6 wherein each of said elements is connected to a further switch and includes means to cause said switch to close when said element is set and causes said switch to open when said element is cleared, the operation of said circuit effecting a controlled closure of a selected switch prior to opening a preselected switch to provide overlap switching.

References Cited

UNITED STATES PATENTS 3,201,594 8/1965 Bongenaar et al.
3,233,112 2/1966 Baldwin.
3,357,010 12/1967 Sweeney.

THOMAS B. HABECKER, Primary Examiner

M. SLOBASKY, Assistant Examiner

U.S. Cl. X.R.

328—59; 340—174